INVENTOR.
JAMES G. HELMUTH
By White & Haefliger
ATTORNEYS.

Nov. 11, 1969   J. G. HELMUTH   3,477,281
MULTIPLE SHAKER CONTROL SYSTEM
Filed Nov. 4, 1965   2 Sheets-Sheet 2
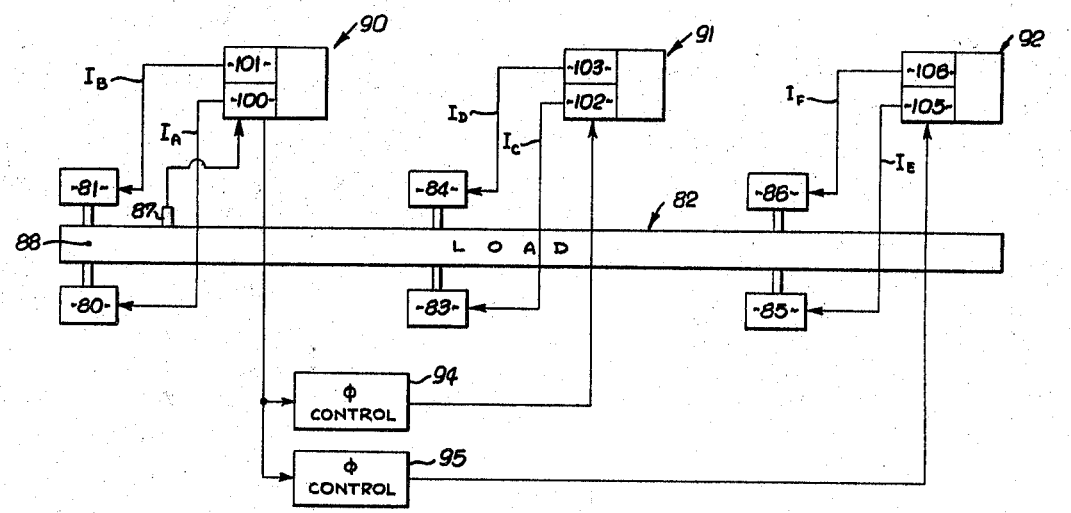
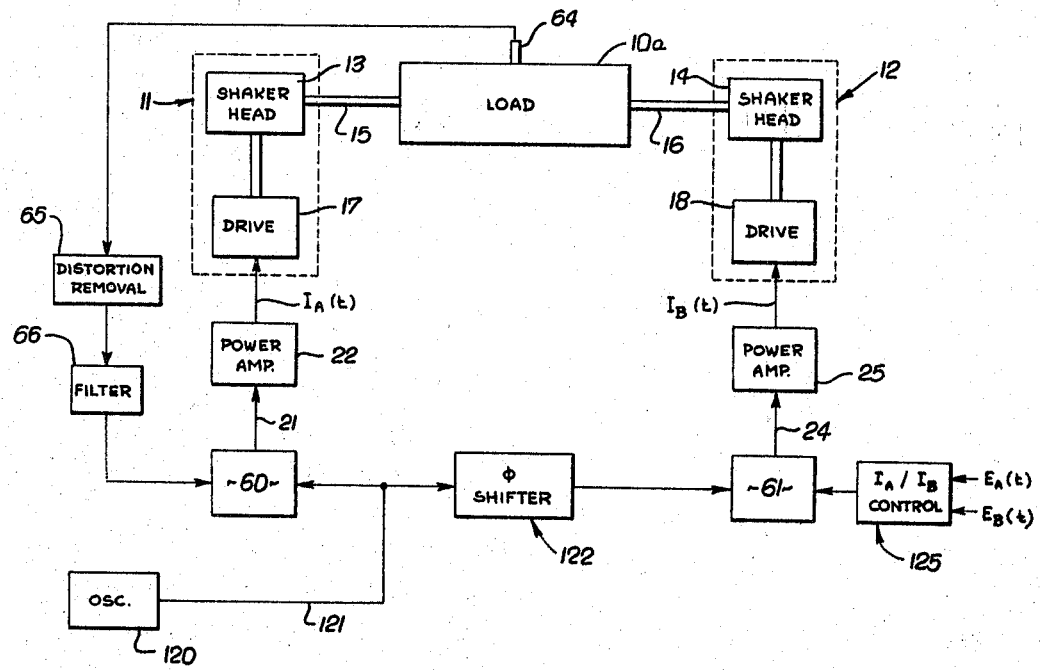
INVENTOR.
JAMES G. HELMUTH
BY White & Haefliger
ATTORNEYS.

United States Patent Office

3,477,281
Patented Nov. 11, 1969

3,477,281
MULTIPLE SHAKER CONTROL SYSTEM
James G. Helmuth, Monrovia, Calif., assignor to Chadwick-Helmuth Electronics, Inc., Monrovia, Calif., a corporation of California
Filed Nov. 4, 1965, Ser. No. 506,330
Int. Cl. G01n *29/00*
U.S. Cl. 73—71.6         9 Claims

ABSTRACT OF THE DISCLOSURE

Apparatus for optimization of efficiency of vibration drive of a load in a multiple shaker system, through control of relative current inputs to the shakers, and input current phase control.

---

This invention relates generally to multiple shaker control systems and more particularly concerns the optimization of efficiency of vibration drive of a load.

In vibration testing of test specimens it is often-times desired to use more than one shaker to excite a single specimen, as for example where the objective is to achieve a prescribed vibration level. It then becomes necessary to produce the sought vibration level in the most efficient manner; however, in certain instances, as for example where the specimen is heavy and stiff, it, together with the fixture, may go into resonance with the result that the force yield at the specimen may be reduced substantially below that expected from the use of more shakers. Examples include the case where there is rigid coupling between shakers, and particularly where two shakers are connected in push-pull across a slip table. Accordingly, the test fails through the inability to achieve the prescribed vibration level.

It is a major object of the present invention to overcome the above disadvantages and to efficiently obtain prescribed vibration levels using multiple shakers. Basically, the invention is adapted for use in combination with multiple shakers such as a first shaker including a drive using cyclic current of amplitude $I_A$ and a second shaker including a drive using cyclic current of amplitude $I_B$, and comprises what may be characterized as amplitude control means to control the ratio of $I_A/I_B$, and/or phase control apparatus to control the phase relationships of the cyclic current so as substantially to optimize the efficiency of vibration drive of the load. Typically, and as respects phase control of shaker drive currents, the control means may include a first oscillator having a shaker control output connectible to control the frequency and phase of the cyclic current of amplitude $I_A$, and a second oscillator having a shaker control output connectible to control the frequency and phase of the cyclic current of amplitude $I_B$, together with means responsive to a fixed frequency output of the first oscillator and to at least one of the current amplitudes $I_A$ and $I_B$ to control the shaker control output of the second oscillator so as to vary the phase of the current $I_B$ in relation to the phase of the current $I_A$ for achieving substantial optimization of the efficiency of vibration drive of the load.

More specifically, the control means may include a source of an oscillatory search signal, a feedback control link including apparatus to derive an error signal $\epsilon$ that varies with $I_B$, combining means to combine the error signal $\epsilon$ with the oscillatory search signal to produce a servo control signal and phase shifting apparatus responsive to changes in the servo control signal and to one secondary frequency output of the first oscillator. As respects current ratio control, the amplitude control means may include a device responsive to amplitude versions of $I_A$ and $I_B$ to derive a subtracted version $\Delta E_{(A-B)}$ thereof, means to derive a signal $E_v$ representing the amplitude of the fundamental pickup frequency of vibration at the load, and combining means to combine $E_v$ with $\Delta E_{(A-B)}$ and thereby to derive an amplitude control signal operable through the second oscillator to control the amplitude of $I_B$ in fixed proportion to the amplitude of $I_A$, and to maintain $I_B$ at an amplitude level established by $I_A$. Further, that level may be maintained by coupling $E_v$ in feedback relation to the amplitude control input of the first oscillator.

Additional objects of the invention include the provision of specific combinations of elements in the feedback control link that derives error signal $\epsilon$, with advantages of simplicity and high accuracy accruing therefrom; and the provision of systems for controlling multiple pairs of shakers in current and phase control modes, as will be described.

These and other objects and advantages of the invention, as well as the details of illustrative embodiments, will be more fully understood from the following detailed description of the drawings in which:

FIG. 2 shows the invention applied to a system with multiple pairs of shakers, phase control of master shakers also being incorporated; and FIG. 3 illustrates a modification of the FIG. 1 circuit.

Figure 1:
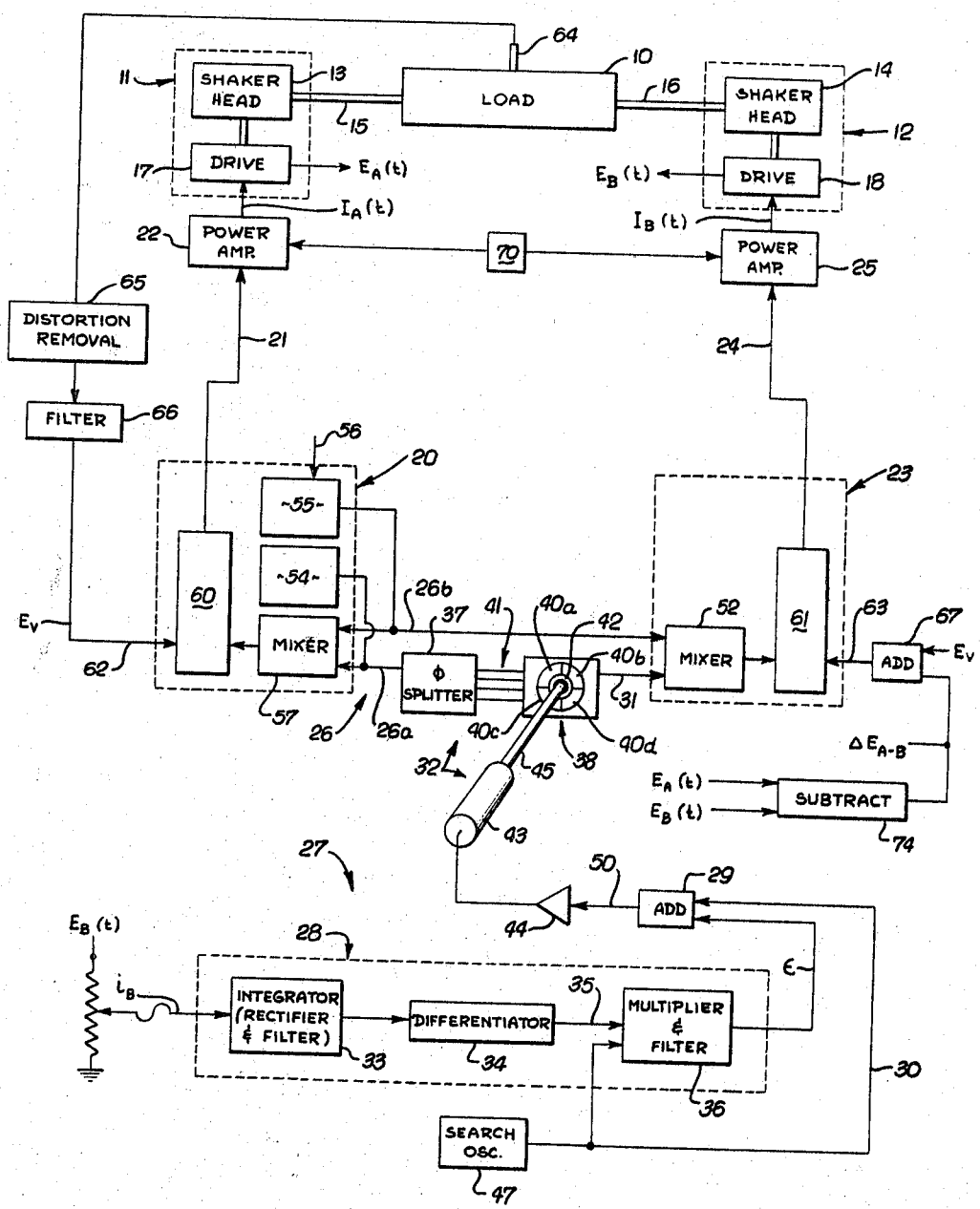
FIG. 1 is a block diagram showing one preferred form of the invention as applied to vibrator shakers.

Referring to FIG. 1, a test specimen is indicated at 10 with master and slave shakers 11 and 12 having heads 13 and 14 coupled at 15 and 16 to the specimen. The first or master shaker 11 includes a suitable drive 17, using cyclic current of amplitude $I_A$, whereas the second or slave shaker 12 has a drive 18 using cyclic current of amplitude $I_B$. Shaker force is proportional to such currents, which may be defined as follows:

$$I_A(t) = I_A(\sin \omega t + \phi_A) \quad (1)$$
$$I_B(t) = I_B(\sin \omega t + \phi_B) \quad (2)$$

showing that a phase difference $\phi_A - \phi_B$ generally exists as between the currents.

The invention has to do generally with the provision of control means including phase control apparatus to control the phase relationship of the cyclic current, and their relative amplitudes, so as to substantially optimize the efficiency of vibration drive of the load or test specimen 10. Thus, the control means typically functions to control the ratio $I_A/I_B$, and to vary $(\phi_A - \phi_B)$, the phase difference between the currents $I_A(t)$ and $I_B(t)$, so as to achieve the optimizing of efficiency of the drive. Efficiency will be understood as the derivation of the highest level of acceleration at the test specimen consistent with near minimum values of the currents $I_A(t)$ and $I_B(t)$. For example, the load may be driven most efficiently with both shakers working in phase, or 180° out of phase in a push-pull arrangement as schematically suggested in FIG. 1. Further, the invention makes possible the maintenance of a fixed acceleration level with near minimum currents in the shakers, without control problems, such as shutoff during resonances. Also, shakers of different power ratings can be used in the system.

The above referred to control means typically includes a master or first oscillator, as for example is seen at 20, having a shaker control output at 21 connected as via power amplifier 22 to produce the cyclic current of amplitude $I_A$. Also, the control means typically includes a slave or second oscillator 23 having a shaker control output at 24 connected via power amplifier 25 to produce the cyclic current of amplitude $I_B$. The outputs at 21 and 24 are typically in the audio or low frequency range and consist of pure sine waves of the same frequency, but with controlled amplitudes and phase displacement. The master oscillator 20 also has secondary frequency output at 26, as for example 30 kilocycles per second at 26a and 25–30 kilocycles per second at 26b, for purposes as will appear. Merely as illustrative, oscillators may comprise Bruel and Kjaer beat frequency oscillators.

The above referred to control means may also be considered to include means responsive to the secondary frequency output at 26 of the first oscillator and to at least one of the current amplitudes $I_A$ and $I_B$ to control the shaker control output at 24 of the second oscillator 23 so as to vary the phase relation or difference ($\phi_A - \phi_B$), for achievement of the substantial optimization of the efficiency of vibrator drive of the test specimen. In this regard, cyclic signals such as voltages $E_A(t)$ and $E_B(t)$ may be developed at the drives 17 and 18 to be respectively proportional to the drive currents $I_A(t)$ and $I_B(t)$.

The means to control the phase of the output of the second shaker so as to vary the phase of the drive current $I_B(t)$ typically includes a source of an oscillatory search signal (see for example source 47), a feedback control link (as for example is seen at 27) including apparatus 28 to derive an error signal $\epsilon$ varying with $I_B$, combining means such as adder 29 to combine error signal $\epsilon$ with the oscillatory search signal 30 to produce a servo control signal at 50, and phase shifting apparatus (as for example is seen at 32). The latter is responsive to changes in the servo control signal and to one secondary frequency output 26a of oscillator 20 to derive at 31 a phase shifted version of the oscillator output 26a.

The apparatus 28 may typically comprise an integrator 33 and differentiator 34 (as for example a high pass filter) connected in series to derive a DC version at 35 of $I_B(t)$ (or current $i_B$ developed by voltage $E_B(t)$ which is proportional to $I_B(t)$), the phase shift introduced by the integrator being removed by the differentiator. Apparatus 28 also includes a multiplier and filter 36 to derive the error signal $\epsilon$ as a product version of the search signal 30 and the DC version 35. Thus, if the source generates a ½ c.p.s. sine wave signal at 30, the DC error signal $\epsilon$ will be a filtered version of the product $|i_B| \times \frac{1}{2} \sin \omega_2 t$, where $\omega_2 = \pi$ rads/sec.

One form of phase shifting apparatus is that indicated at 32 to include a phase splitter 37 and phase capacitor 38 having stator elements to which the splitter outputs are respectively applied. Thus, a fixed 30 kc. signal output 26a generated at 54 in the first oscillator may be quadrature phase shifted by 0, ½π, π and ³⁄₂π radians and applied to the four stators of the phase capacitor. The latter may have a rotor element that picks off a signal that smoothly varies from 0 to 2π radians for each revolution of the rotor. The four stators are indicated schematically at 40a, 40b, 40c and 40d; the four-phase shifted inputs to the capacitor stators are seen at 41; and the capacitor rotor is indicated schematically at 42. The rotor drive includes a motor 43 having its input coupled via amplifier 44 to the servo control signal 50, and having its output coupled at 45 to the rotor 42.

The secondary frequency output 26b generated at 55 in the first oscillator 20 typically is controllable at 56 and over a range such that when mixed with the phase shifted fixed frequency signal at 31 it produces the audio (phase controlled) output 24 from the second oscillator 23. Thus, the output 26b may for example be varied between 25 and 30 kc. for mixing with the phase shifted 30 kc. signal 31 in the mixer or demodulator section 52 of oscillator 23. First oscillator 20 may likewise have a demodulator section 57 for mixing the variable frequency output 26b with the fixed frequency output 26a (not subjected to phase control) to produce the audio output 21 from the first oscillator. Thus, audio outputs 21 and 24 have the same frequency but the phase of output 24 is controllable with respect to the phase of output 21, the control being such as to optimize the efficiency of the shaker drive of the load, as previously mentioned.

The oscillators 20 and 23 also have sections 60 and 61 for controlling the gain or amplitudes of the outputs at 21 and 24. The inputs to these gain controls are indicated at 62 and 63. In this regard, $I_A$ may be maintained at controlled amplitude level by the provision of means to derive a signal $E_v$ representing the amplitude of the fundamental pickup frequency of vibration at the load 10, that signal $E_v$ then being coupled in feedback relation to the amplitude control input 62 to the first oscillator 20. Such a means may for example include the vibration pickup or transducer 64 coupled to the load, but typically not at the shaker drive points thereof. The signal output from the pickup commonly includes the fundamental shaker frequency plus harmonics or distortion, which is removed at 65, thereby to derive the fundamental frequency which is filtered at 66 to derive $E_v$. The latter control signal is likewise shown as applied via adder 67 to the amplitude control input 63 to the second oscillator 23.

Coming now to the description of the means to control the amplitudes $I_A$ and $I_B$ of the shaker currents, it may typically include a device responsive to amplitude versions of $I_A$ and $I_B$ to derive a subtracted version $\Delta E_{(A-B)}$ thereof, together with means to combine $E_v$ with $\Delta E_{(A-B)}$ and thereby derive an amplitude control signal operable through the second oscillator to control the second shaker current amplitude $I_B$ to substantially equal the first shaker current amplitude $I_A$. In this regard, desired power input to the shaker drives may be set by controlling the power amplifiers 22 and 25 at 70, and the automatic control operates to minimize the current $I_A(t)$ and $I_B(t)$ drawn by the shaker drives from the power amplifiers. The subtracted version $\Delta E_{(A-B)}$ may for example be derived by subtraction device 74 having inputs $E_A(t)$ and $E_B(t)$ proportional to the currents $I_A(t)$ and $I_B(t)$ or the amplitudes thereof.

In operation, the feedback signal $E_v$ holds the current amplitude $I_A$ constant, and $I_B$ is held equal to $I_A$ by the amplitude control means that includes elements 74 and 67. The search oscillator drives the servo motor 43 slowly back and forth through a small search angle, as for example ±15°, causing the phase angle $\phi_B$ to vary with respect to $\phi_A$. This causes the current $I_B$ to vary as the shakers oppose or aid each other while the vibration level remains constant. In addition to "searching," the rotor 42 of the capacitor 38 slowly turns until $\epsilon$ equals zero. At that time the $\phi_B$ for $I_B(t)$ is such as corresponds to minimum drive currents $I_A$ and $I_B$, for maximum efficiency.

The invention may be incorporated in the system of FIG. 2 illustrating the provision of first and second shakers 80 and 81 to drive the load 82, the blocks 80 and 81 incorporating the shaker drives drawing cyclic currents of amplitudes $I_A$ and $I_B$ respectively, and third and fourth shakers 83 and 84 to drive the load, the blocks 83 and 84 incorporating shaker drives drawing cyclic currents of amplitudes $I_C$ and $I_D$ respectively. Fifth and sixth shakers 85 and 86 are also indicated, to incorporate drives drawing cyclic currents of amplitudes $I_E$ and $I_F$, thereby showing the manner in which the system may be extended. The system also incorporates the improvement comprising current amplitude and phase control apparatus to control the amplitude and phase relationships of the cyclic currents $I_A$ and $I_B$, of the cyclic currents $I_C$ and $I_D$, and also of the cyclic currents $I_E$ and $I_F$, so as to substantially optimize the efficiency of vibration drive of the load 82, and in the manner described above. Thus, block 90 may be considered to incorporate control apparatus the same as or equivalent to that of FIG. 1 to control amplitude and phase relationships of the currents $I_A$ and $I_B$, and blocks 91 and 92 control the amplitude and phase relationships of the currents $I_C$ and $I_D$, and of the currents $I_E$ and $I_F$. The "search" frequencies (as described at 47 above) associated with the blocks 90–92 are slightly different for each block, to prevent search response coupling through the load specimen.

In addition, phase control means is incorporated at 94 and 95 in the FIG. 2 system respectively to control the phase relationships of the currents $I_A$ and $I_C$, and of the currents $I_A$ and $I_E$. Thus, the shakers 80 and 83, and also 85 if desired, may be locked in phase, or in any phase offset selected, to simulate the desired environment. The phase of the motion of the load measured by pick-up or accelerometer 87 at or near the drive point 88 of the master shaker 80 may be used as a reference to control the phase of the shakers 83 and 85.

Oscillators 100 and 101 in block 90 control currents $I_A(t)$ and $I_B(t)$ to shakers 80 and 81; oscillators 102 and 103 in block 91 control currents $I_C(t)$ and $I_D(t)$ to shakers 83 and 84; and oscillators 105 and 106 in block 92 control currents $I_E(t)$ and $I_F(t)$ to shakers 85 and 86. Phase control 94 is responsive to the output of the oscillator 100 (controlling current $I_A$) to control the phase of the oscillator 102 so as to control the phase of current $I_C$, and phase control 95 is also responsive to the output of the oscillator 100 to control the phase of the oscillator 105 so as to control the phase of current $I_E$. Such phase control may be implemented according to the description in Operation and Maintenance Manual, Series 500, Multiple Shaker Control Systems, published by Chadwick-Helmuth Electronics, Inc. of Monrovia, California.

FIG. 3 illustrates a modified form of the FIG. 1 circuit, in which certain blocks retain the same numbers as in FIG. 1. The control means includes oscillator apparatus such as 120 having shaker control output at 121 connectible to produce the cyclic currents $I_A(t)$ and $I_B(t)$. Means generally indicated at 122 is responsive to output of the oscillator apparatus to control the phase relationship of the cyclic current. As shown, the variable phase shifter means 122 control the phase of cyclic current $I_B(t)$ relative to the phase of cyclic current $I_A(t)$.

Also shown in FIG. 3 are means responsive to the oscillator apparatus output to control the relative amplitudes of the cyclic currents. Such means may include the servo level or gain controls 60 and 61 as previously described, the former connected directly with the oscillator output 121, and the latter connected via means 122 with that output. Relative amplitude control apparatus is seen at 125, and may include the components 67 and 74 as described in FIG. 1.

I claim:
1. In combination with first and second shakers to vibrate a load at selected level, the first shaker including a drive drawing cyclic current of amplitude $I_A$ and the second shaker including a drive drawing cyclic current of amplitude $I_B$, the improvement comprising drive current amplitude and current phase control means operatively connected to said drives to vary automatically the magnitude and phase of $I_B$ relative to the magnitude and phase of $I_A$, said control means including, oscillator apparatus and means responsive to shaker control output of said apparatus connected to one of said shaker drives, said phase control means being responsive to output of said oscillator apparatus and to shaker drive cyclic current, and means responsive to said phase control means to produce a cyclic current for the other shaker drive having the desired phase relationship with the cyclic current of the first shaker drive for substantially minimiing at least one of $I_A$ and $I_B$ for a given level of acceleration produced at a selected zone of the load.

2. For combination with first and second shakers to vibrate a load at selected level, the first shaker including a drive drawing cyclic current of amplitude $I_A$ and the second shaker including a drive drawing cyclic current of amplitude $I_B$, the improvement comprising control means controlling the relative magnitudes and phase relationships of $I_A$ and $I_B$ so as to substantially optimize the efficiency of vibration drive of the load, said control means including a first oscillator having a shaker control output controlling the first shaker drive to produce the cyclic current of amplitude $I_A$, and a second oscillator having a shaker control output controlling the second shaker drive to produce the cyclic current of amplitude $I_B$, the first oscillator also having secondary frequency outputs, and means responsive to at least one secondary frequency output of the first oscillator and to at least one of said cyclic currents to control the shaker control output of the second oscillator so as to vary the phase of the current $I_B$ in relation to the phase of the current $I_A$ to achieve said substantial optimization of the efficiency of vibration drive of the load, the first oscillator being a master oscillator and the second oscillator a slave oscillator.

3. The combination of claim 2 in which said last named means includes a source of an oscillatory search signal, a feedback control link including apparatus to derive an error signal $\epsilon$ varying with $I_B$, combining means to combine error signal $\epsilon$ with said oscillatory search signal to produce a servo control signal, and phase shifting apparatus responsive to changes in said servo control signal, and to one secondary frequency output of the first oscillator to derive a phase shifted version of said secondary frequency output of the first oscillator.

4. The combination of claim 3 in which said error signal deriving apparatus comprises an integrator and differentiator responsive to $I_B$ to derive a DC signal version of $I_B$, and a multiplier and filter to derive the error signal $\epsilon$ as a product version of said oscillatory search signal and said DC signal version, said integrator, differentiator, multiplier and filter being connected in electrical sequence.

5. The combination of claim 3 in which said phase shifting apparatus includes a phase splitter and phase capacitor having stator elements to which the splitter outputs are respectively applied, the capacitor having a rotor element, and a drive for said rotor element and responsive to said servo control signal to control the phase of said secondary frequency output of the first oscillator.

6. The combination of claim 5 including a demodulator to mix said phase shifted version of said one secondary frequency output of the first oscillator with another secondary frequency output of the first oscillator to derive said shaker control output of the second oscillator.

7. The combination of claim 2 in which said amplitude control apparatus includes a device responsive to amplitude versions of $I_A$ and $I_B$ to derive a subtracted version $\Delta E_{(A-B)}$ thereof, means to derive a signal $E_v$ representing the amplitude of the fundamental pickup frequency of vibration at the load, and combining means to combine $E_v$ with $\Delta E_{(A-B)}$ and thereby to derive an amplitude control signal controlling said second oscillator to control the amplitude of $I_B$ in proportion to the amplitude of $I_A$.

8. The combination of claim 7 including means to derive a signal $E_v$ representing the amplitude of the fundamental pickup frequency of vibration at the load, said signal $E_v$ being coupled in feedback relation to the amplitude control input to said first oscillator to maintain $I_A$ at controlled level.

9. The combination of claim 2 including said shakers.

References Cited
UNITED STATES PATENTS

| 2,362,467 | 11/1944 | Clark | 73—67.2 |
| 3,224,255 | 12/1965 | Woods | 73—71.6 |
| 3,015,948 | 1/1962 | Kearns | 73—67.2 |
| 3,074,385 | 1/1963 | Nass | 73—71.5 XR |

OTHER REFERENCES

The Calidyne Co. Bulletin No. 4401, October 1950, 4 sheets.

Dickie, John A. Hydraulic Vibrators, Dec. 9, 1957, Product Engineering, Design Edition, p. 94–98.

RICHARD C. QUEISSER, Primary Examiner

JOHN P. BEAUCHAMP, Assistant Examiner

U.S. Cl. X.R.

318—37, 127